United States Patent
Kim et al.

(10) Patent No.: US 9,419,700 B2
(45) Date of Patent: Aug. 16, 2016

(54) METHOD FOR WIRELESS COMMUNICATION BASED ON RELAY AND APPARATUS FOR THE SAME

(71) Applicant: Electronics & Telecommunications Research Institute, Daejeon (KR)

(72) Inventors: Il Gyu Kim, Seoul (KR); Seung Chan Bang, Seoul (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 45 days.

(21) Appl. No.: 14/217,577

(22) Filed: Mar. 18, 2014

(65) Prior Publication Data

US 2014/0269455 A1    Sep. 18, 2014

(30) Foreign Application Priority Data

Mar. 18, 2013    (KR) .................. 10-2013-0028840
Mar. 10, 2014    (KR) .................. 10-2014-0027599

(51) Int. Cl.
*H04B 7/155* (2006.01)
*H04W 84/04* (2009.01)
*H04W 88/04* (2009.01)
*H04W 48/12* (2009.01)

(52) U.S. Cl.
CPC ........... *H04B 7/15542* (2013.01); *H04W 48/12* (2013.01); *H04W 84/047* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 8,155,016 | B2 * | 4/2012 | Zhang | H04B 7/155 370/252 |
| 8,223,854 | B2 * | 7/2012 | Ghosh | H04L 1/0068 375/260 |
| 2002/0090942 | A1 * | 7/2002 | Karabinis | H04B 7/18563 455/427 |
| 2007/0104223 | A1 * | 5/2007 | Lee | H04W 72/042 370/470 |
| 2008/0045143 | A1 * | 2/2008 | Yoshida | H04W 16/28 455/7 |
| 2009/0207761 | A1 * | 8/2009 | Tangemann | H04B 7/155 370/281 |
| 2010/0008282 | A1 * | 1/2010 | Bhattad | H04J 11/0069 370/312 |
| 2010/0215009 | A1 * | 8/2010 | Yu | H04W 72/0446 370/329 |
| 2011/0149813 | A1 * | 6/2011 | Parkvall | H04B 7/2656 370/280 |
| 2011/0310789 | A1 | 12/2011 | Hu et al. | |
| 2012/0069795 | A1 | 3/2012 | Chung et al. | |
| 2012/0257519 | A1 * | 10/2012 | Frank | H04L 5/0035 370/252 |
| 2014/0126501 | A1 * | 5/2014 | Pan | H04L 5/0032 370/329 |

FOREIGN PATENT DOCUMENTS

KR    10-2010-0098752    9/2010
WO    WO 2010/143867 A1    12/2010

* cited by examiner

*Primary Examiner* — Benjamin H Elliott, IV
*Assistant Examiner* — Eric Nowlin
(74) *Attorney, Agent, or Firm* — NSIP Law (57) ABSTRACT

Methods for wireless communications based on relay and apparatuses for the same are disclosed. The method for a terminal to transmit signals comprises receiving scheduling information from a base station connected to the terminal; generating uplink data based on the scheduling information; performing punctuation on a data symbol positioned in a region through a downlink synchronization signal is transmitted in the generated uplink data; and transmitting the punctured uplink data. Therefore, the terminal may acquire synchronization signal easily, and perform neighbor cell search correctly based on the acquired synchronization signal.

12 Claims, 10 Drawing Sheets

METHOD FOR WIRELESS COMMUNICATION BASED ON RELAY AND APPARATUS FOR THE SAME

CLAIM FOR PRIORITY

This application claims priority to Korean Patent Applications No. 10-2013-0028840 filed on Mar. 18, 2013 and No. 10-2014-0027599 filed on Mar. 10, 2014 in the Korean Intellectual Property Office (KIPO), the entire contents of which are hereby incorporated by reference.

BACKGROUND

1. Technical Field

Example embodiments of the present invention relate in general to a wireless communication technology, and more specifically, to a method for transmitting data in a communication system including at least one relay base station, and an apparatus for the same.

2. Related Art

Generally, a communication system including a relay base station may comprise a central base station, at least one relay base station, and at least one terminal. The terminal may perform communications as it is connected to an upper central base station or an upper relay base station. The relay base station may provide communication services to lower terminals as it is connected to an upper central base station or an upper other relay base station. The central base station may be connected to a core network through a backhaul.

When such the communication system operates in a frequency division duplexing (FDD) manner, a central base station, a relay base station, and a terminal may use $F_0$ as uplink carrier frequency or downlink carrier frequency, and use $F_1$ as downlink carrier frequency or uplink carrier frequency.

For example, the central base station may use $F_0$ as downlink frequency resource and $F_1$ as uplink frequency resource. On the contrary, a lower relay base station connected to the central base station may use $F_0$ as uplink frequency resource and $F_1$ as downlink frequency resource. The terminal connected to the relay base station may use $F_0$ as uplink frequency resource and $F_1$ as downlink frequency resource identically to the relay base station.

Under the above-described environment, a terminal in a state (that is, an active state) of communicating with at least one base station (that is, the central base station or the relay base station) should search both $F_0$ and $F_1$ in order to search neighbor cells for performing handover. However, it is difficult to perform cell-search since a signal which is transmitted through $F_0$ exists as an uplink signal. That is, since there may be collisions between uplink signal and downlink signal which are transmitted through $F_0$, there may be a problem that a terminal cannot acquire a synchronization signal correctly.

SUMMARY

Accordingly, example embodiments of the present invention are provided to substantially obviate one or more problems due to limitations and disadvantages of the related art.

An example embodiment of the present invention provides a method for transmitting signal which can prevent collisions with synchronization signals in a communication system including at least one relay base station.

Another example embodiment of the present invention provides a signal transmitting apparatus which can prevent collisions with synchronization signals in a communication system including at least one relay base station.

In an example embodiment, a method for a terminal to transmit signals in a communication system including a central base station and at least one relay base station may comprise receiving scheduling information from a base station connected to the terminal; generating uplink data based on the scheduling information; performing puncturing on data symbols positioned in a region through a downlink synchronization signal is transmitted in the generated uplink data; and transmitting the punctured uplink data.

Here, the terminal may be connected to the central base station or the at least one relay base station, and the terminal may use a radio resource identical to a radio resource of a backhaul link between the connected base station and a lower relay base station for an access link to the connected base station.

Here, the central base station may use a first radio resource for a downlink to a first lower relay base station and a second radio resource for an uplink from the first lower relay base station, and the first lower relay base station may use the second radio resource for a downlink to a second lower relay base station and the first radio resource for an uplink from the second lower relay base station.

Also, when the terminal is connected to the central base station, the terminal may use the first radio resource for a downlink from the central base station and the second radio resource for an uplink to the central base station.

Also, when the terminal is connected to the first lower relay base station, the terminal may use the second radio resource for a downlink from the first lower relay base station and the first radio resource for an uplink to the first lower relay base station.

Also, when the terminal is connected to the second lower relay base station, the terminal may use the first radio resource for a downlink from the second lower relay base station and the second radio resource for an uplink to the second lower relay base station.

Here, the first radio resource and the second radio resource may be frequency resources when the communication system operates in a frequency division duplexing (FDD) manner.

Here, the first radio resource and the second radio resource may be time resources when the communication system operates in a time division duplexing (TDD) manner.

Here, the downlink synchronization signal may be transmitted from at least one of the central base station and the at least one relay base station.

Here, at least one of the central base station and the at least one relay base station may use an antenna having a switching beam structure.

In another example embodiment, a method for a terminal to transmit signal in a communication system including a central base station and at least one relay base station may comprise receiving scheduling information from a base station connected to the terminal; allocating uplink data to radio resources except a region through a downlink synchronization signal is transmitted based on the scheduling information; and transmitting the allocated uplink data.

Here, the terminal may be connected to the central base station or the at least one relay base station, and the terminal may use a radio resource identical to a radio resource of a backhaul link between the connected base station and a lower relay base station for an access link to the connected base station.

Here, the downlink synchronization signal may be transmitted from at least one of the central base station and the at least one relay base station.

Here, at least one of the central base station and the at least one relay base station may use an antenna having a switching beam structure.

In other example embodiment, a terminal, connected to a central base station or a relay base station in a communication system including the central base station and at least one relay base station, may comprise a processing part configuring a downlink between the terminal and a base station connected to the terminal by using radio resources identical to radio resources of a downlink between the connected base station and a lower relay base station, and configuring an uplink between the terminal and the connected base station by using radio resources identical to radio resources of an uplink between the connected base station and the lower base station; and a storing part storing information processed and to be processed in the processing part.

Here, the central base station may use a first radio resource for a downlink to a first lower relay base station and a second radio resource for an uplink from the first lower relay base station, and the first relay base station may use a third radio resource for a downlink to a second lower relay base station and a fourth radio resource for an uplink from the second lower relay base station.

Also, when the terminal is connected to the central base station, the terminal may use the first radio resource for a downlink from the central base station and the second radio resource for an uplink to the central base station.

Also, when the terminal is connected to the first lower relay base station, the terminal may use the second radio resource for a downlink from the first lower relay base station and the first radio resource for an uplink to the first lower relay base station.

Here, the first, second, third and fourth radio resources may be frequency resources when the communication system operates in a frequency division duplexing (FDD) manner.

Here, the first, second, third and fourth radio resources may be time resources when the communication system operates in a time division duplexing (TDD) manner.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, embodiments of the present invention will be described in detail with reference to the appended drawings. In the following description, for easy understanding, like numbers refer to like elements throughout the description of the figures, and the same elements will not be described further.

The term "network" used in this specification may include a mobile internet such as a Wireless Fidelity (WIFI), a Wireless Broadband Internet (WiBro), and a World Interoperability for Microwave Access (WiMax). Also, it may include 2G cellular network such as a Global System for Mobile communication (GSM) and a Code Division Multiple Access (CDMA), 3G cellular network such as a Wideband Code Division Multiple Access (WCDMA) and a CDMA2000. Also, it may include 3.5G cellular network such as a High Speed Downlink Packet Access (HSDPA) and a High Speed Uplink Packet Access (HSUPA). Also, it may include 4G or beyond 4G cellular network such as a Long Term Evolution (LTE) and a LTE-Advanced.

The term "terminal" used in this specification may be referred to as User Equipment (UE), a User Terminal (UT), a wireless terminal, an Access Terminal (AT), a Subscriber Unit (SU), a Subscriber Station (SS), a wireless device, a wireless communication device, a Wireless Transmit/Receive Unit (WTRU), a mobile node, a mobile, or other words. The terminal may be a cellular phone, a smart phone having a wireless communication function, a Personal Digital Assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, or also a portable unit or terminal having a combination of such functions. However, the terminal is not limited to the above-mentioned units.

Also, the term "base station" used in this specification means a fixed point that communicates with terminals, and may be referred to as another word, such as Node-B, eNode-B, a base transceiver system (BTS), an access point, etc. Also, the term "base station" means a controlling apparatus which controls at least one cell. In a real wireless communication system, a base station may be connected to and controls a plurality of cells physically, in this case, the base station may be regarded to comprise a plurality of logical base stations. That is, parameters configured to each cell are assigned by the corresponding base station.

Figure 1:
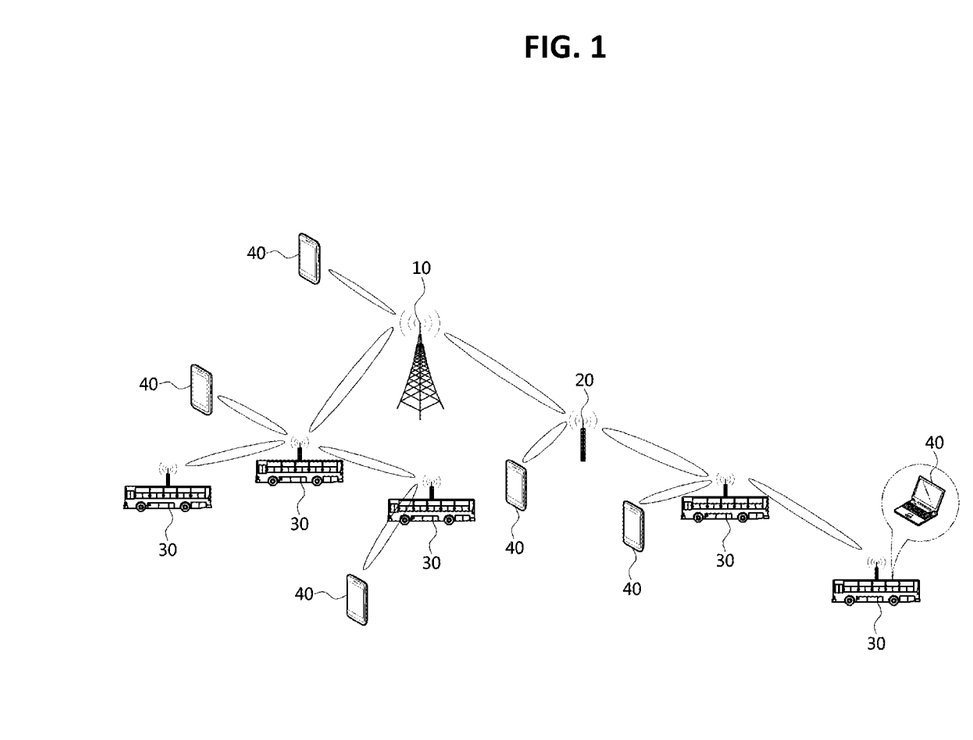
FIG. 1 is a conceptual diagram illustrating an example embodiment of a communication system.

FIG. 1 is a conceptual diagram illustrating an example embodiment of a communication system.

Referring to FIG. 1, a communication system may comprise a central base station 10, at least one fixed relay base station 20, at least one mobile relay base station 30, and at least one terminal 40. The central base station 10 may be located in an arbitrary position as fixed, and may be connected to a core network through a wireless backhaul or a wired backhaul (for example, optic cables).

The relay base station may mean a relay apparatus. The relay base station may relay communications between the central base station 10 in an upper layer and the terminal 40 in a lower layer, or may relay communications between the central base station 10 in an upper layer and other relay base stations in a lower layer, or may relay communication between other relay base station in a upper layer and other relay base station in a lower layer, or may relay communications between other relay base station in an upper layer and the terminal 40 in a lower layer.

The relay base station may be classified into a fixed relay base station 20 and a mobile relay base station 30. The fixed relay base station 20 may be located in an arbitrary position as fixed similarly to the central base station 10. The fixed relay base station 20 may be connected to the upper central base station 10, an upper other relay base station, or a lower other relay base station through wireless backhaul, and may be connected to a terminal 40 through an access link. On the other hand, the fixed relay base station 20 may be connected to the upper central base station 10 through a wired backhaul.

The mobile relay base station 30 may mean a base station installed in a moving object such as a vehicle, a train, etc. The mobile relay base station 30 may be connected to the upper central base station 10, an upper other relay base station, or a lower other relay base station through a wireless backhaul, and may be connected to a terminal 40 through an access link. The mobile relay base station 30 may provide a wireless LAN service based on the IEEE 802.11 standard or a femto access service to a terminal 40 located in its cell range. In this case, the mobile relay base station 30 may include an apparatus converting data received from the upper base station through the backhaul to data according to the WLAN service standard specification or the femto access service standard specification.

Figure 2:
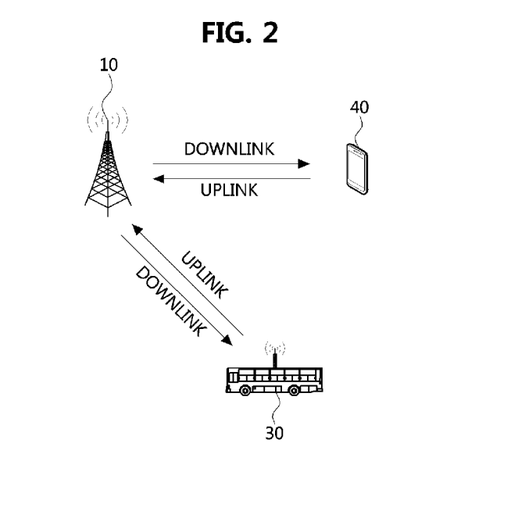
FIG. 2 is a conceptual diagram illustrating uplink and downlink in a communication system.

FIG. 2 is a conceptual diagram illustrating uplink and downlink in a communication system.

Referring to FIG. 2, a communication system may comprise a central base station 10, a mobile relay base station (or, a fixed relay base station) 30, and a terminal 40. The terminal 40 may be connected to the central base station 10.

Here, among backhaul links between the upper central base station 10 and the lower mobile base station 30, a link from the upper central base station 10 to the lower mobile base station 30 may mean a downlink, and a link from the lower mobile base station 30 to the upper central base station 10 may mean an uplink.

Meanwhile, among access links between the central base station 10 and the terminal 40, a link from the central base station 10 to the terminal 40 may mean a downlink, and a link from the terminal 40 to the central base station 10 may mean an uplink.

When the above described relationship is generalized, it may be summarized as below table 1. The meanings of uplink and downlink in the present invention may be explained as below table 1.

TABLE 1

| | |
|---|---|
| A link from an upper base station to a lower base station | Downlink |
| A link from a lower base station to an upper base station | Uplink |
| A link from a base station to a terminal | Downlink |
| A link from a terminal to a base station | Uplink |

Figure 3:
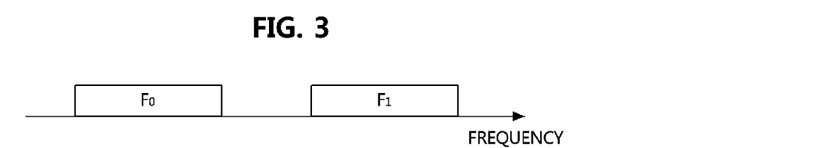
FIG. 3 is a conceptual diagram illustrating frequency resources when a communication system operates in a frequency division duplexing manner.

FIG. 3 is a conceptual diagram illustrating frequency resources when a communication system operates in a frequency division duplexing manner.

Referring to FIG. 3, when a communication system operates in a frequency division duplexing (FDD) manner, $F_0$ may be used as an uplink (or downlink) frequency resource, and $F_1$ may be used as a downlink (or uplink) frequency resource.

Figure 4:
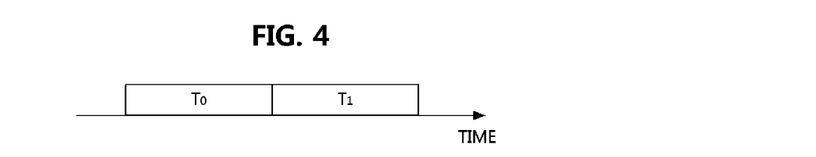
FIG. 4 is a conceptual diagram illustrating time resources when a communication system operates in a time division duplexing manner.

FIG. 4 is a conceptual diagram illustrating time resources when a communication system operates in a time division duplexing manner.

Referring to FIG. 4, when a communication system operates in a time division duplexing (FDD) manner, $T_0$ may be used as an uplink (or downlink) time resource, and $T_1$ may be used as a downlink (or uplink) time resource.

Figure 5:
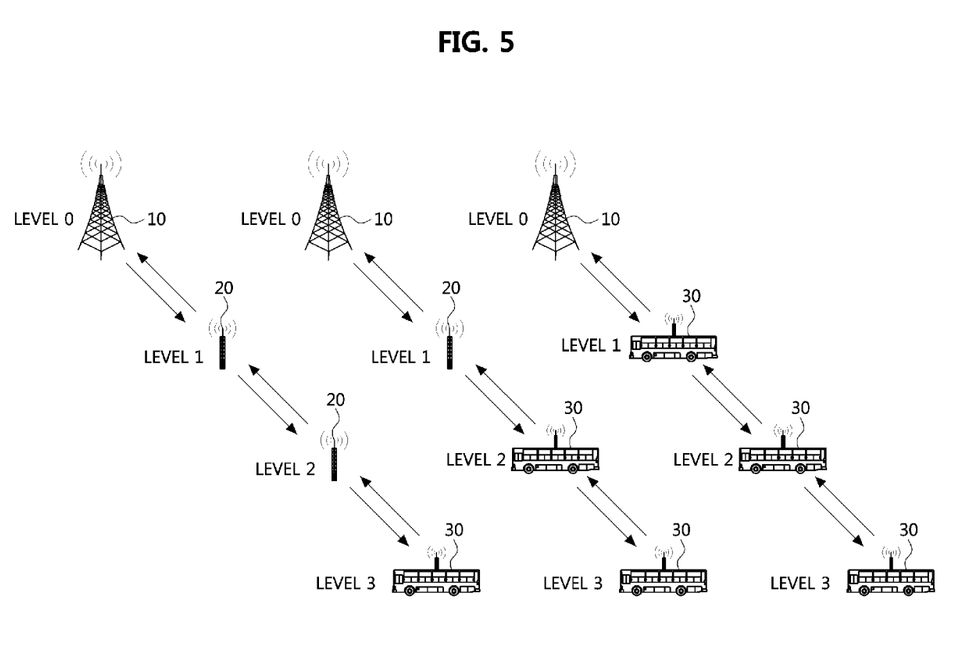
FIG. 5 is a conceptual diagram illustrating a structure of a communication system including at least one relay base station.

FIG. 5 is a conceptual diagram illustrating a structure of a communication system including at least one relay base station.

Referring to FIG. 5, a communication system may comprise a central base station 10, at least one fixed relay base station 20, and at least one mobile relay base station 30. When the central base station is defined as level 0, the relay base stations 20 and 30 may be defined as level 1, 2, or 3. For example, a first relay base station connected to the central base station 10 of level 0 may be defined as level 1, and a second lower relay base station connected to the first relay base station may be defined as level 2, and a third lower relay base station connected to the second relay base station may be defined as level 3.

That is, a base station having a lower level number than a current base station may be defined as an upper base station, and a base station having a higher level number than a current base station may be defined as a lower base station.

Figure 6:
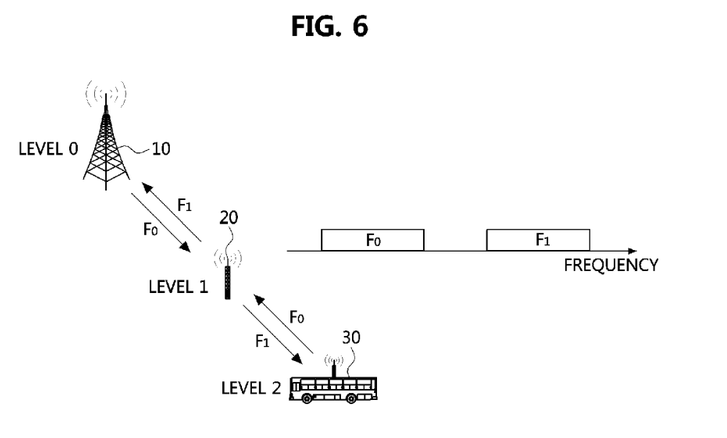
FIG. 6 is a conceptual diagram illustrating an example embodiment of a communication system operating in a frequency division duplexing manner.

FIG. 6 is a conceptual diagram illustrating an example embodiment of a communication system operating in a frequency division duplexing manner.

Referring to FIG. 6, a central base station 10 of level 0 may be connected to a lower fixed relay base station 20 of level 1, and the fixed relay base station 20 of level 1 may be connected to a lower mobile relay base station 30 of level 2.

$F_0$ may be used as a downlink frequency resource between the central base station 10 and the fixed relay base station 20, and $F_1$ may be used as an uplink frequency resource between the central base station 10 and the fixed relay base station 20. $F_1$ may be used as a downlink frequency resource between the fixed relay base station 20 and the mobile relay base station 30, and $F_0$ may be used as an uplink frequency resource between the fixed relay base station 20 and the mobile relay base station 30.

That is, the frequency resource used for downlink transmissions between the base station of level 0 and the base station of level 1 may be used for uplink transmissions between the base station of level 1 and the base station of level 2. Also, the frequency resource used for uplink transmissions between the base station of level 0 and the base station of level 1 may be used for downlink transmissions between the base station of level 1 and the base station of level 2.

Figure 7:
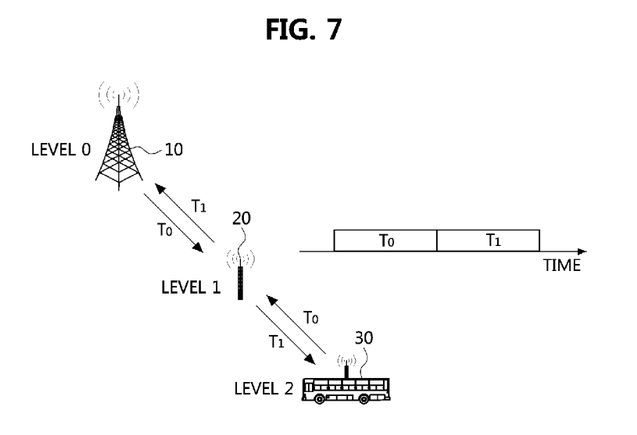
FIG. 7 is a conceptual diagram illustrating an example embodiment of a communication system operating in a time division duplexing manner.

FIG. 7 is a conceptual diagram illustrating an example embodiment of a communication system operating in a time division duplexing manner.

Referring to FIG. 7, a central base station 10 of level 0 may be connected to a lower fixed relay base station 20 of level 1, and the fixed relay base station 20 of level 1 may be connected to a lower mobile relay base station 30 of level 2.

$T_0$ may be used as a downlink time resource between the central base station 10 and the fixed relay base station 20, and $T_1$ may be used as an uplink time resource between the central base station 10 and the fixed relay base station 20. $T_1$ may be used as a downlink time resource between the fixed relay base station 20 and the mobile relay base station 30, and $T_0$ may be used as an uplink time resource between the fixed relay base station 20 and the mobile relay base station 30.

That is, the time resource used for downlink transmissions between the base station of level 0 and the base station of level 1 may be used for uplink transmissions between the base station of level 1 and the base station of level 2. Also, the time resource used for uplink transmissions between the base station of level 0 and the base station of level 1 may be used for downlink transmissions between the base station of level 1 and the base station of level 2.

Hereinafter, a communication system, to which a frequency division duplexing (FDD) based method for transmitting signals according to an example embodiment of the present invention is applied, and a communication system, to which a time division duplexing (TDD) based method for transmitting signals according to another example embodiment of the present invention is applied, will be explained.

Figure 8:
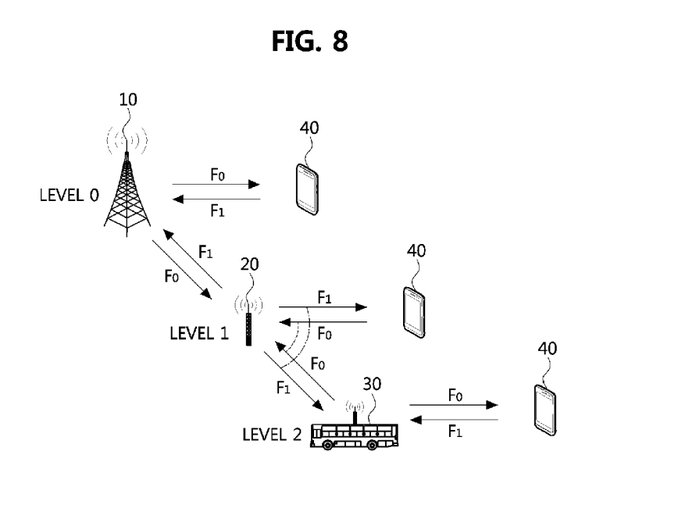
FIG. 8 is a conceptual diagram illustrating an example embodiment of a communication system including a plurality of base stations.

FIG. 8 is a conceptual diagram illustrating an example embodiment of a communication system including a plurality of base stations.

Referring to FIG. 8, a communication system may comprise a central base station 10, a fixed relay base station 20, a mobile relay base station 30, and at least one terminal 40. The central base station 10 of level 0 may be connected to the lower fixed relay base station 20 of level 1, and the fixed relay base station 20 of level 1 may be connected to the lower mobile relay base station 30 of level 2.

$F_0$ may be used as a downlink frequency resource between the central base station 10 and the fixed relay base station 20, and $F_1$ may be used as an uplink frequency resource between the central base station 10 and the fixed relay base station 20. $F_1$ may be used as a downlink frequency resource between the fixed relay base station 20 and the mobile relay base station 30, and $F_0$ may be used as an uplink frequency resource between the fixed relay base station 20 and the mobile relay base station 30.

When the terminal 40 is connected to the central base station 10, $F_0$ may be used as a downlink frequency resource between the central base station 10 and the terminal 40, and $F_1$ may be used as an uplink frequency resource between them. That is, the frequency resource used for downlink transmissions between the central base station 10 and the terminal 40 may be identical to the downlink frequency resource between the central base station 10 and the fixed relay base station 20. Also, the frequency resource used for uplink transmissions between the central base station 10 and the terminal 40 may be identical to the uplink frequency resource used between the central base station 10 and the fixed relay base station 20.

When the terminal 40 is connected to the fixed relay base station 20, $F_1$ may be used as a downlink frequency resource between the fixed relay base station 20 and the terminal 40, and $F_0$ may be used as an uplink frequency resource between them. That is, the frequency resource used for downlink transmissions between the fixed relay base station 20 and the terminal 40 may be identical to the downlink frequency resource between the fixed relay base station 20 and the mobile relay base station 30. Also, the frequency resource used for uplink transmissions between the fixed relay base station 20 and the terminal 40 may be identical to the uplink frequency resource used between the fixed relay base station 20 and the mobile relay base station 30.

When the terminal 40 is connected to the mobile relay base station 30, $F_0$ may be used as a downlink frequency resource between the mobile relay base station 30 and the terminal 40, and $F_1$ may be used as an uplink frequency resource between them. That is, the frequency resource used for downlink transmissions between the mobile relay base station 30 and the terminal 40 may be identical to the downlink frequency resource between the mobile relay base station 30 and a lower other base station (not depicted). Also, the frequency resource used for uplink transmissions between the mobile relay base station 30 and the terminal 40 may be identical to the uplink frequency resource used between the mobile relay base station 30 and the lower other base station.

Based on the above descriptions, it can be known that the access link between a terminal and a base station to which the terminal is connected uses a frequency resource identical to that of a backhaul link between the base station (level n) and a lower base station (level n+1).

Figure 9:
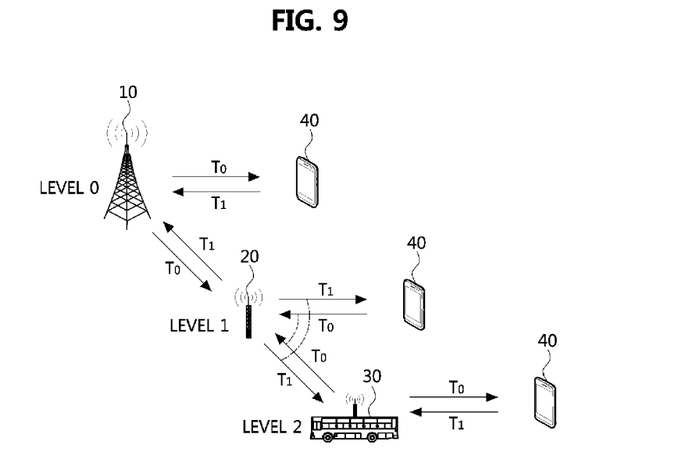
FIG. 9 is a conceptual diagram illustrating another example embodiment of a communication system including a plurality of base stations.

FIG. 9 is a conceptual diagram illustrating another example embodiment of a communication system including a plurality of base stations.

Referring to FIG. 9, a communication system may comprise a central base station 10, a fixed relay base station 20, a mobile relay base station 30, and at least one terminal 40. The central base station 10 of level 0 may be connected to the lower fixed relay base station 20 of level 1, and the fixed relay base station 20 of level 1 may be connected to the lower mobile relay base station 30 of level 2.

$T_0$ may be used as a downlink time resource between the central base station 10 and the fixed relay base station 20, and $T_1$ may be used as an uplink time resource between the central base station 10 and the fixed relay base station 20. $T_1$ may be used as a downlink time resource between the fixed relay base station 20 and the mobile relay base station 30, and $T_0$ may be used as an uplink time resource between the fixed relay base station 20 and the mobile relay base station 30.

When the terminal 40 is connected to the central base station 10, $T_0$ may be used as a downlink time resource between the central base station 10 and the terminal 40, and $T_1$ may be used as an uplink time resource between them. That is, the time resource used for downlink transmissions between the central base station 10 and the terminal 40 may be identical to the downlink time resource between the central base station 10 and the fixed relay base station 20. Also, the time resource used for uplink transmissions between the central base station 10 and the terminal 40 may be identical to the uplink time resource used between the central base station 10 and the fixed relay base station 20.

When the terminal 40 is connected to the fixed relay base station 20, $T_1$ may be used as a downlink time resource between the fixed relay base station 20 and the terminal 40, and $T_0$ may be used as an uplink time resource between them. That is, the time resource used for downlink transmissions between the fixed relay base station 20 and the terminal 40 may be identical to the downlink time resource between the fixed relay base station 20 and the mobile relay base station 30. Also, the time resource used for uplink transmissions between the fixed relay base station 20 and the terminal 40 may be identical to the uplink time resource used between the fixed relay base station 20 and the mobile relay base station 30.

When the terminal 40 is connected to the mobile relay base station 30, $T_0$ may be used as a downlink time resource between the mobile relay base station 30 and the terminal 40, and $T_1$ may be used as uplink time resource between them. That is, the time resource used for downlink transmissions between the mobile relay base station 30 and the terminal 40 may be identical to the downlink time resource between the mobile relay base station 30 and a lower other base station (not depicted). Also, the time resource used for uplink transmissions between the mobile relay base station 30 and the terminal 40 may be identical to the uplink time resource used between the mobile relay base station 30 and the lower other base station.

Based on the above descriptions, it can be known that the access link between a terminal and a base station to which the terminal is connected uses a time resource identical to that of a backhaul link between the base station (level n) and a lower base station (level n+1).

Figure 10:
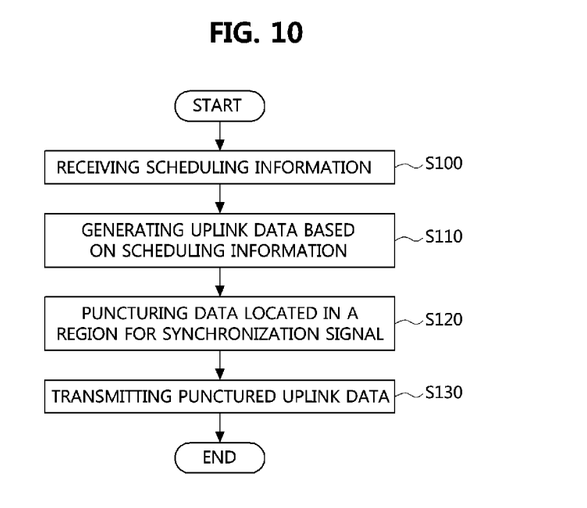
FIG. 10 is a flow chart illustrating a method for a terminal to transmit signal according to an example embodiment of the present invention.

FIG. 10 is a flow chart illustrating a method for a terminal to transmit signals according to an example embodiment of the present invention.

Here, the method for a terminal may be performed in the communication system described by referring to FIG. 8 and the communication system described by referring to FIG. 9. That is, the terminal in the following descriptions may mean the terminal 40 depicted in FIG. 8 or the terminal 40 depicted in FIG. 9. Also, a base station (that is, a central base station, a fixed relay base station, or a mobile relay base station) may use an antenna having a switching beam structure.

Referring to FIG. 10, a terminal may receive scheduling information from a base station to which the terminal is connected (S100). For example, when the terminal is connected to a central base station, the terminal may receive the scheduling information from the central base station. Also, when the terminal is connected to a fixed relay base station, the terminal may receive the scheduling information from the fixed relay base station. Also, when the terminal is connected to a mobile relay base station, the terminal may receive the scheduling information from the mobile relay base station.

In this case, the terminal may receive the scheduling information through a radio resource identical to a radio resource (that is, a frequency resource for FDD or a time resource for TDD) used for downlink transmissions between a base station to which the terminal is connected (that is, a base station of level n) and a lower base station (that is, a base station of level n+1).

If the scheduling information is analyzed and it is identified based on the scheduling information that a radio resource for uplink transmission is allocated, the terminal may generate uplink data which will be transmitted to a base station (S110).

After generating the uplink data, the terminal may perform puncturing on data symbols in a region for transmitting downlink synchronization signal (S120). The downlink synchronization signal may mean a synchronization signal which is transmitted from the base station to which the terminal is connected, or a synchronization signal which is transmitted from an upper base station (that is, level n−1, n−2, or n−3, . . . ) than the base station (that is, level n) to which the terminal is connected, or a synchronization signal which is transmitted from a lower base station (that is, level n+1, n+2, or n+3, . . . ) than the base station (that is, level n).

The terminal may obtain information about the region through the downlink synchronization signal is transmitted from the scheduling information, or receive the information from a corresponding base station when the terminal is connected to the corresponding base station. On the other hand, the terminal may perform puncturing on data symbols according to the known methods when the terminal performs puncturing.

Then, the terminal may transmit the punctured uplink data (S130). In this case, the terminal may transmit the punctured uplink data through a radio resource identical to a radio resource used for uplink transmissions between the base station (that is, level n) to which the terminal is connected and a lower base station (that is, level n+1).

On the other hand, when the terminal performs cell search on neighbor cells, the terminal may search neighbor cells by performing frequency/time filtering on the synchronization signal region of downlink signals so that interferences generated by transmitted signals on received signals may be minimized.

Figure 11:
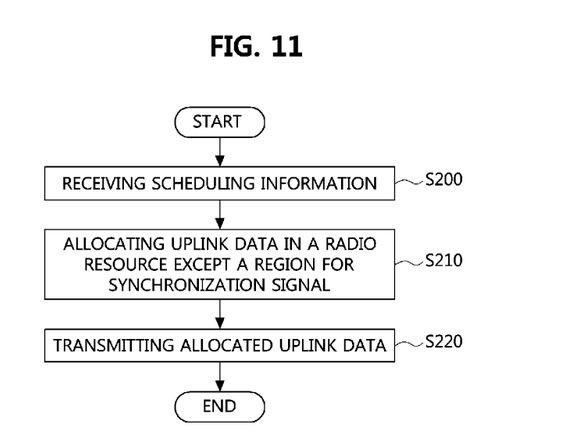
FIG. 11 is a flow chart illustrating a method for a terminal to transmit signal according to another example embodiment of the present invention.

FIG. 11 is a flow chart illustrating a method for a terminal to transmit signal according to another example embodiment of the present invention.

Here, the method for a terminal may be performed in the communication system described by referring to FIG. 8 and the communication system described by referring to FIG. 9. That is, the terminal in the following descriptions may mean the terminal 40 depicted in FIG. 8 or the terminal 40 depicted in FIG. 9. Also, a base station (that is, a central base station, a fixed relay base station, or a mobile relay base station) may use an antenna having a switching beam structure.

Referring to FIG. 11, a terminal may receive scheduling information from a base station to which the terminal is connected (S200). For example, when the terminal is connected to a central base station, the terminal may receive the scheduling information from the central base station. Also, when the terminal is connected to a fixed relay base station, the terminal may receive the scheduling information from the fixed relay base station. Also, when the terminal is connected to a mobile relay base station, the terminal may receive the scheduling information from the mobile relay base station.

In this case, the terminal may receive the scheduling information through a radio resource identical to a radio resource (that is, a frequency resource for FDD or a time resource for TDD) used for downlink transmissions between a base station to which the terminal is connected (that is, a base station of level n) and a lower base station (that is, a base station of level n+1).

The terminal may obtain information about the region through which a downlink synchronization signal is transmitted from the scheduling information, and allocate uplink data in radio resources except the region through which the downlink synchronization signal is transmitted (S210). Or, the terminal may obtain information about the region through the downlink synchronization signal is transmitted from a corresponding base station when the terminal is connected to the corresponding base station, and allocate uplink data in radio resources based on the obtained information about the region.

Then, the terminal may transmit the uplink data (S220). In this case, the terminal may transmit the uplink data through a radio resource (that is, a frequency resource for FDD case and a time resource for TDD case) identical to a radio resource used for uplink transmissions between the base station (that is, level n) to which the terminal is connected and a lower base station (that is, level n+1).

On the other hand, when the terminal performs cell search on neighbor cells, the terminal may search neighbor cells by performing frequency/time filtering on the synchronization signal region of downlink signals so that interferences generated by transmitted signals on received signals may be minimized.

Figure 12:
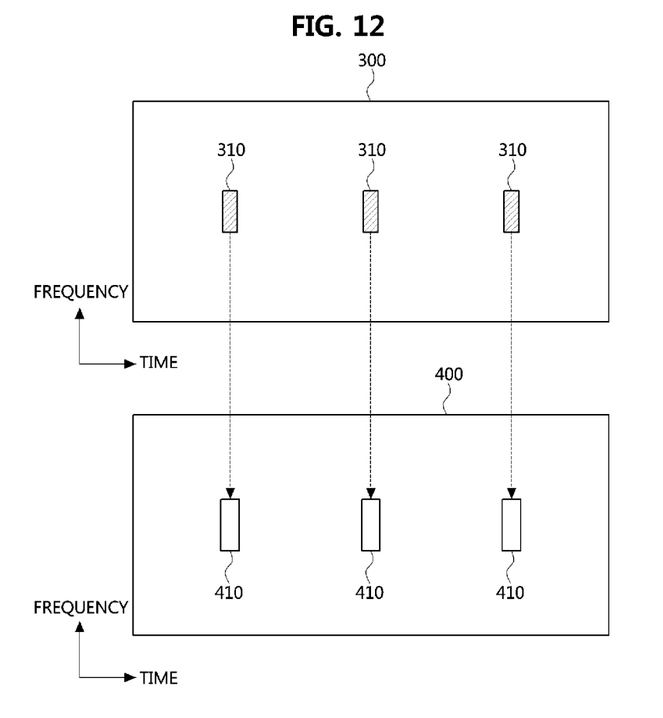
FIG. 12 is a conceptual diagram illustrating an uplink frame according to an example embodiment of the present invention.

FIG. 12 is a conceptual diagram illustrating an uplink frame according to an example embodiment of the present invention.

Here, the uplink frame 400 may mean uplink data transmitted by the method which was explained referring to FIG. 10, or uplink data transmitted by the method which was explained referring to FIG. 11.

Referring to FIG. 12, a base station (that is, a central base station, a fixed relay base station, a mobile relay base station) may transmit a downlink frame 300 including at least one synchronization signal 310. When a downlink radio resource of a base station (for example, the downlink frequency resource $F_0$ of the central base station 10 in FIG. 8) and an uplink radio resource of a terminal (for example, the uplink frequency resource $F_0$ of the terminal 40 connected to the fixed relay base station 20 in FIG. 8) are identical, the downlink frame 300 transmitted from the base station may collide with the uplink frame 400 transmitted from the terminal so that the terminal cannot receive the synchronization signal 310.

In order to prevent the above-described situation, the terminal may not allocate uplink data in a region 410 corresponding to a region to which the synchronization signal 310 is allocated in the uplink frame 400. That is, the terminal may perform puncturing (according to the method of FIG. 10) so that uplink data is not allocated to the corresponding region 410. Or, the terminal may allocate uplink data to radio resources except the region 410 corresponding to the region to which the synchronization signal 310 is allocated according to the method of FIG. 11 so that uplink data is not allocated to the region 410.

Figure 13:
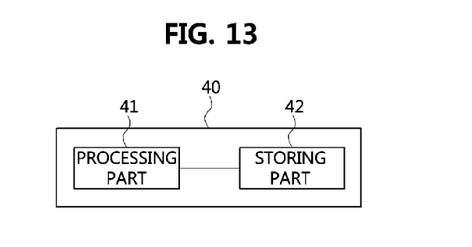
FIG. 13 is a block diagram illustrating a terminal according to an example embodiment of the present invention.

FIG. 13 is a block diagram illustrating a terminal according to an example embodiment of the present invention.

Referring to FIG. 13, a terminal 40 may comprise a processing part 41 and a storing part 42. The terminal 40 may be connected to a central base station or a relay base station. The processing part 41 may configure a radio resource (that is, a frequency resource for FDD case and a time resource for TDD case) identical to that of a downlink between a base station to which the terminal 40 is connected and a lower relay base station as a resource for downlink between the terminal 40 and the connected base station, and configure a radio resource identical to that of an uplink between the connected base station and the lower relay base station as a resource for uplink between the terminal 40 and the connected base station. The method for configuring radio resources which will be used for downlink and uplink will be explained by referring to FIG. 14 and FIG. 15 in the following descriptions.

Here, the processing part 41 may comprise a processor and a memory. The processor may mean a general-purpose processor (for example, a Central Processing Unit (CPU), etc.) or a dedicated processor for performing the method for configuring radio resources. A program code for executing the method for configuring radio resource may be stored in the memory. That is, the processor may read out the program code stored in the memory, and execute each step of the method for configuring radio resources based on the program code which is read out from the memory.

The storing part 42 may store information processed and to be processed by the processing part 41. For example, the storing part 42 may store scheduling information, downlink radio resource information, uplink radio resource information, etc.

Figure 14:
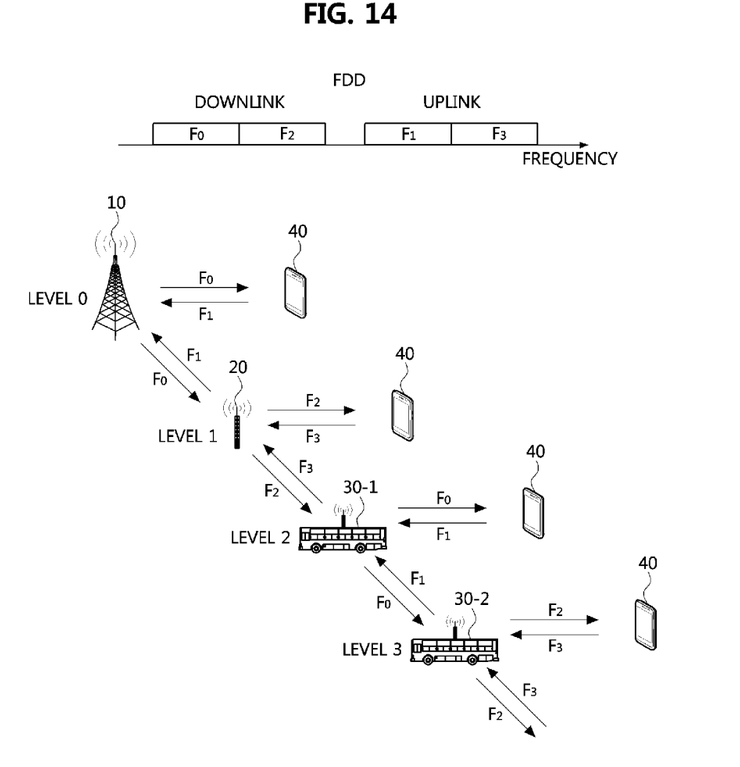
FIG. 14 is a conceptual diagram illustrating an example of radio resource configuration in a communication system according to an example embodiment of the present invention.

FIG. 14 is a conceptual diagram illustrating an example of radio resource configuration in a communication system according to an example embodiment of the present invention.

Referring to FIG. 14, the communication system may comprise a central base station 10, a fixed relay base station 20, a first mobile relay base station 30-1, a second mobile relay base station 30-2, and a terminal 40. The communication system may operate in a FDD manner. $F_0$ and $F_2$ are used as downlink frequency resources, and $F_1$ and $F_3$ are used as uplink frequency resources. The central base station 10 of level 0 may be connected to the fixed relay base station 20 of level 1, and the fixed relay base station 20 of level 1 may be connected to the lower first mobile relay base station 30-1 of level 2, and the first mobile relay base station 30-1 of level 2 may be connected to the lower second mobile relay base station 30-2 of level 3.

$F_0$ may be used as a downlink frequency resource between the central base station 10 and the fixed relay base station 20, and $F_1$ may be used as an uplink frequency resource between them. $F_2$ may be used as a downlink frequency resource between the fixed relay base station 20 and the first mobile relay base station 30-1, and $F_3$ may be used as an uplink frequency resource between them. $F_0$ may be used as a downlink frequency resource between the first mobile relay base station 30-1 and the second mobile relay base station 30-2, and $F_1$ may be used as an uplink frequency resource between them. $F_2$ may be used as a downlink frequency resource between the second mobile relay base station 30-2 and a lower other relay base station (not depicted), and $F_3$ may be used as an uplink frequency resource between them.

When the terminal 40 is connected to the central base station 10, the terminal 40 may configure a downlink frequency resource $F_0$ between the central base station 10 and the fixed relay base station 10 as a downlink frequency resource between itself and the central base station 10, and may configure an uplink frequency resource $F_1$ between the central base station 10 and the fixed relay base station 20 as an uplink frequency resource between itself and the central base station 10.

When the terminal 40 is connected to the fixed relay base station 20, the terminal 40 may configure a downlink frequency resource $F_2$ between the fixed relay base station 20 and the first mobile relay base station 30-1 as a downlink frequency resource between itself and the fixed relay base station 20, and may configure an uplink frequency resource $F_3$ between the fixed relay base station 20 and the first mobile relay base station 30-1 as an uplink frequency resource between itself and the fixed relay base station 20.

When the terminal 40 is connected to the first mobile relay base station 30-1, the terminal 40 may configure a downlink frequency resource $F_0$ between the first mobile relay base station 30-1 and the second mobile relay base station 30-2 as a downlink frequency resource between itself and the first mobile relay base station 30-1, and may configure an uplink frequency resource $F_1$ between the first mobile relay base station 30-1 and the second mobile relay base station 30-2 as an uplink frequency resource between itself and the first mobile relay base station 30-1.

When the terminal 40 is connected to the second mobile relay base station 30-2, the terminal 40 may configure a downlink frequency resource $F_2$ between the second mobile relay base station 30-2 and a lower other relay base station as a downlink frequency resource between itself and the second mobile relay base station 30-2, and may configure an uplink frequency resource $F_3$ between the second mobile relay base station 30-2 and the lower other relay base station as an uplink frequency resource between itself and the second mobile relay base station 30-2.

Based on the above descriptions, it can be known that the access link between a terminal and a base station to which the terminal is connected uses a frequency resource identical to that of a backhaul link between the connected base station (that is, level n) and a lower base station (that is, level n+1).

Figure 15:
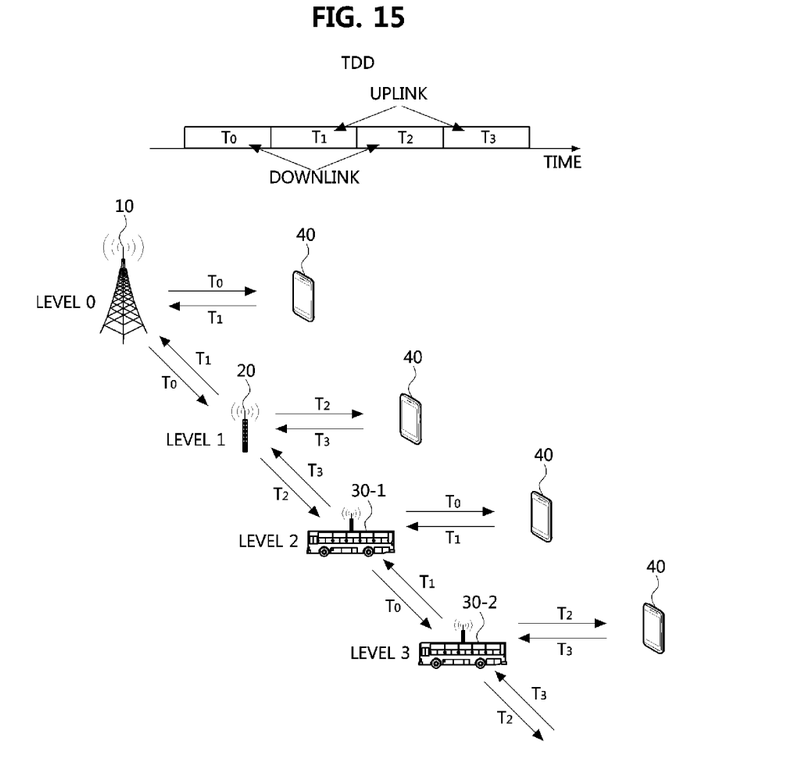
FIG. 15 is a conceptual diagram illustrating an example of radio resource configuration in a communication system according to another example embodiment of the present invention.

FIG. 15 is a conceptual diagram illustrating an example of radio resource configuration in a communication system according to another example embodiment of the present invention.

Referring to FIG. 15, the communication system may comprise a central base station 10, a fixed relay base station 20, a first mobile relay base station 30-1, a second mobile relay base station 30-2, and a terminal 40. The communication system may operate in a TDD manner. $T_0$ and $T_2$ are used as downlink time resources, and $T_1$ and $T_3$ are used as uplink time resources. The central base station 10 of level 0 may be connected to the fixed relay base station 20 of level 1, and the fixed relay base station 20 of level 1 may be connected to the lower first mobile relay base station 30-1 of level 2, and the first mobile relay base station 30-1 of level 2 may be connected to the lower second mobile relay base station 30-2.

$T_0$ may be used as a downlink time resource between the central base station 10 and the fixed relay base station 20, and $T_1$ may be used as an uplink time resource between them. $T_2$ may be used as a downlink time resource between the fixed relay base station 20 and the first mobile relay base station 30-1, and $T_3$ may be used as an uplink time resource between them. $T_0$ may be used as a downlink time resource between the first mobile relay base station 30-1 and the second mobile relay base station 30-2, and T1 may be used as an uplink frequency time between them. $T_2$ may be used as a downlink time resource between the second mobile relay base station 30-2 and a lower other relay base station (not depicted), and $T_3$ may be used as an uplink time resource between them.

When the terminal 40 is connected to the central base station 10, the terminal 40 may configure a downlink time resource $T_0$ between the central base station 10 and the fixed relay base station 10 as a downlink time resource between itself and the central base station 10, and may configure an uplink time resource $T_1$ between the central base station 10 and the fixed relay base station 20 as an uplink time resource between itself and the central base station 10.

When the terminal 40 is connected to the fixed relay base station 20, the terminal 40 may configure a downlink time resource $T_2$ between the fixed relay base station 20 and the first mobile relay base station 30-1 as a downlink time resource between itself and the fixed relay base station 20, and may configure an uplink time resource $T_3$ between the fixed relay base station 20 and the first mobile relay base station 30-1 as an uplink time resource between itself and the fixed relay base station 20.

When the terminal 40 is connected to the first mobile relay base station 30-1, the terminal 40 may configure a downlink time resource $T_0$ between the first mobile relay base station 30-1 and the second mobile relay base station 30-2 as a downlink time resource between itself and the first mobile relay base station 30-1, and may configure an uplink time resource $T_1$ between the first mobile relay base station 30-1 and the second mobile relay base station 30-2 as an uplink time resource between itself and the first mobile relay base station 30-1.

When the terminal 40 is connected to the second mobile relay base station 30-2, the terminal 40 may configure a downlink time resource $T_2$ between the second mobile relay base station 30-2 and a lower other relay base station as a downlink time resource between itself and the second mobile relay base station 30-2, and may configure an uplink time resource $T_3$ between the second mobile relay base station 30-2 and the lower other relay base station as an uplink time resource between itself and the second mobile relay base station 30-2.

Based on the above descriptions, it can be known that the access link between a terminal and a base station to which the terminal is connected uses a time resource identical to that of a backhaul link between the connected base station (that is, level n) and a lower base station (that is, level n+1).

Figure 16:
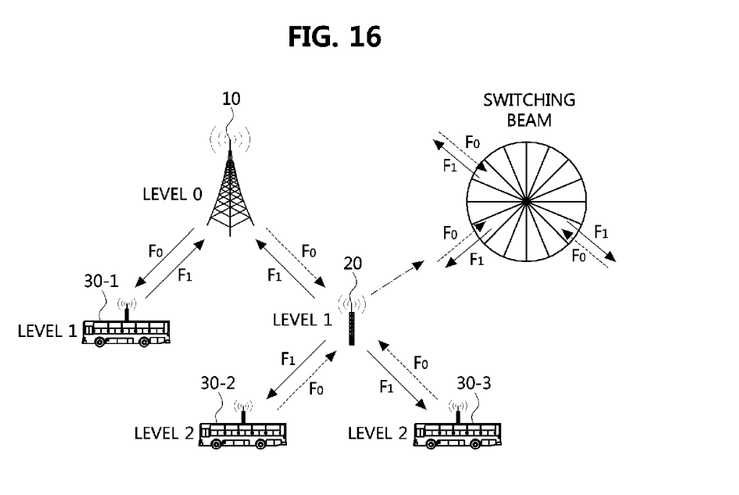
FIG. 16 is a conceptual diagram illustrating an example embodiment of a communication system including a relay base station using a switching beam antenna.

FIG. 16 is a conceptual diagram illustrating an example embodiment of a communication system including a relay base station using a switching beam antenna.

Referring to FIG. 16, the communication system may comprise a central base station 10, a fixed relay base station 20, a first mobile relay base station 30-1, a second mobile relay base station 30-2, and a third mobile relay base station 30-3. The central base station 10 of level 0 may be connected to the fixed relay base station 20 of level 1 and the first mobile relay base station 30-1 of level 1. The fixed relay base station 20 of level 1 may be connected to the second mobile relay base station 30-2 of level 2 and the third mobile relay base station 30-3 of level 2.

$F_0$ may be used as a downlink frequency resource between the central base station 10 and the first mobile relay base station 30-1, and $F_1$ may be used as an uplink frequency resource between them. $F_0$ may be used as a downlink frequency resource between the central base station 10 and the fixed relay base station 20, and $F_1$ may be used as an uplink frequency resource between them. $F_1$ may be used as a downlink frequency resource between the fixed relay base station 20 and the second mobile relay base station 30-1, and $F_0$ may be used as an uplink frequency resource between them. $F_1$ may be used as a downlink frequency resource between the fixed relay base station 20 and the third mobile relay base station 30-3, and $F_0$ may be used as an uplink frequency resource between them.

Here, the fixed relay base station 20 may perform communications with other base stations (that is, the central base station 10, the second mobile relay base station 30-2, and the third mobile relay base station 30-3) by using a switching beam antenna. In this case, the fixed relay base station 20 may perform communications with the central base station 10 by using a beam directed toward the central base station 10, communications with the second mobile relay base station 30-2 by using a beam directed toward the second mobile relay base station 30-2, and communications with the third mobile relay base station 30-3 by using a beam directed toward the third mobile relay base station 30-3.

Figure 17:
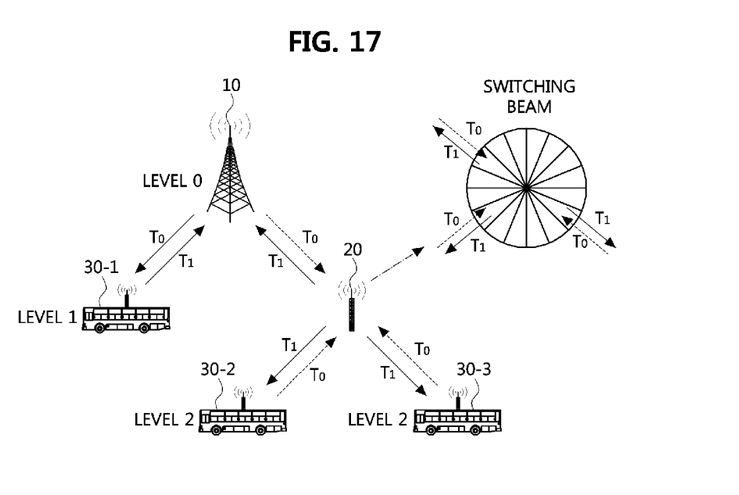
FIG. 17 is a conceptual diagram illustrating another example embodiment of a communication system including a relay base station using a switching beam antenna.

FIG. 17 is a conceptual diagram illustrating another example embodiment of a communication system including a relay base station using a switching beam antenna.

Referring to FIG. 17, the communication system may comprise a central base station 10, a fixed relay base station 20, a first mobile relay base station 30-1, a second mobile relay base station 30-2, and a third mobile relay base station 30-3. The central base station 10 of level 0 may be connected to the fixed relay base station 20 of level 1 and the first mobile relay base station 30-1 of level 1. The fixed relay base station 20 of level 1 may be connected to the second mobile relay base station 30-2 of level 2 and the third mobile relay base station 30-3 of level 2.

$T_0$ may be used as a downlink time resource between the central base station 10 and the first mobile relay base station 30-1, and $T_1$ may be used as an uplink time resource between them. $T_0$ may be used as a downlink time resource between the central base station 10 and the fixed relay base station 20, and $T_1$ may be used as an uplink time resource between them. $T_1$ may be used as a downlink time resource between the fixed relay base station 20 and the second mobile relay base station 30-1, and $T_0$ may be used as an uplink time resource between them. $T_1$ may be used as a downlink time resource between the fixed relay base station 20 and the third mobile relay base station 30-3, and $T_0$ may be used as an uplink time resource between them.

Here, the fixed relay base station 20 may perform communications with other base stations (that is, the central base station 10, the second mobile relay base station 30-2, and the third mobile relay base station 30-3) by using a switching beam antenna. In this case, the fixed relay base station 20 may perform communications with the central base station 10 by using a beam directed toward the central base station 10, communications with the second mobile relay base station 30-2 by using a beam directed toward the second mobile relay base station 30-2, and communications with the third mobile relay base station 30-3 by using a beam directed toward the third mobile relay base station 30-3.

According to the present invention, a collision between uplink signals and downlink signals transmitted through identical radio resources may be prevented. Therefore, a terminal may acquire synchronization signal easily, and perform neighbor cell search correctly based on the acquired synchronization signal. Accordingly, efficiency of a communication system also may be enhanced.

While the example embodiments of the present invention and their advantages have been described in detail, it should be understood that various changes, substitutions and alterations may be made herein without departing from the scope of the invention.

What is claimed is:

1. A method for transmitting signals performed in a first terminal connected to a first base station in a communication system, the method comprising:
    wherein downlink transmission between the first terminal and the first base station is performed through a first radio link, uplink transmission between the first terminal and the first base station is performed through a second radio link, the first base station is connected to a second base station which is connected to a second terminal, downlink transmission between the second terminal and the second base station is performed through the second radio link, and uplink transmission between the second terminal and the second base station is performed through the first radio link,
    receiving scheduling information from the first base station through the first radio link;
    generating uplink data based on the scheduling information;
    performing puncturing on uplink data symbols positioned in a region to which a downlink synchronization signal is allocated, wherein the downlink synchronization signal is transmitted from the second base station to the second terminal through the second radio link; and
    transmitting punctured uplink data through the second radio link.

2. The method of claim 1, wherein downlink transmission from the first base station to the second base station is performed through the first radio link, and uplink transmission from the second base station to the first base station is performed through the second radio link.

3. The method of claim 1, wherein, in the communication system based on a frequency division duplexing (FDD) manner, frequency resources used for the first radio link are different from frequency resources used for the second radio link.

4. The method of claim 1, wherein, in the communication system based on a time division duplexing (TDD) manner, time resources used for the first radio link are different from time resources used for the second radio link.

5. The method of claim 1, wherein at least one of the first base station and the second base station uses an antenna having a switching beam structure.

6. A method for transmitting signals performed in a first terminal connected to a first base station in a communication system, the method comprising:
    wherein downlink transmission between the first terminal and the first base station is performed through a first radio link, uplink transmission between the first terminal and the first base station is performed through a second radio link, the first base station is connected to a second base station which is connected to a second terminal, downlink transmission between the second terminal and the second base station is performed through the second radio link, and uplink transmission between the second terminal and the second base station is performed through the first radio link,
    receiving scheduling information from the first base station through the first radio link;

allocating uplink data to radio resources except a region to which a downlink synchronization signal is allocated, wherein the downlink synchronization signal is transmitted from the second base station to the second terminal through the second radio link based on the scheduling information; and transmitting the allocated uplink data through the second radio link.

7. The method of claim 6, wherein downlink transmission from the first base station to the second base station is performed through the first radio link, and uplink transmission from the second base station to the first base station is performed through the second radio link.

8. The method of claim 6, wherein at least one of the first base station and the second base station uses an antenna having a switching beam structure.

9. A first terminal connected to a first base station in a communication system, the first terminal comprising:

a memory for storing a program; and a processor connected to the memory and adapted to execute the program, wherein downlink transmission between the first terminal and the first base station is performed though a first radio link, uplink transmission between the first terminal and the first base station is performed through a second radio link, the first base station is connected to a second base station which is connected to a second terminal, downlink transmission between the second terminal and the second base station is performed through the second radio link, and uplink transmission between the second terminal and the second base station is performed through the first radio link, wherein, in accordance with the program, the processor:

receives scheduling information from the first base station through the first radio link;

generates uplink data based on the scheduling information;

performs puncturing on uplink data symbols positioned in a region to which a downlink synchronization signal is allocated, where the downlink synchronization signal is transmitted from the second base station to the second terminal through the second radio link; and transmits punctured uplink data through the second radio link.

10. The terminal of claim 9, wherein downlink transmission from the first base station to the second base station is performed through the first radio link, and uplink transmission from the second base station to the first base station is performed through the second radio link.

11. The terminal of claim 9, wherein, in the communication system based on a frequency division duplexing (FDD) manner, frequency resources used for the first radio link are different from frequency resources used for the second radio link.

12. The terminal of claim 9, wherein, in the communication system based on a time division duplexing (TDD) manner, time resources used for the first radio link are different from time resources used for the second radio link.

* * * * *